United States Patent [19]
Bauman

[11] Patent Number: 6,039,375
[45] Date of Patent: Mar. 21, 2000

[54] GRIPPER ASSEMBLY WITH INTEGRATED HEAT SHIELD

[75] Inventor: Thomas C. Bauman, North Prairie, Wis.

[73] Assignee: ABB Flexible Automation, Inc., New Berlin, Wis.

[21] Appl. No.: 09/014,199

[22] Filed: Jan. 28, 1998

[51] Int. Cl.[7] .................................................. B25J 15/00
[52] U.S. Cl. ..................... 294/119.1; 294/86.4; 294/88; 414/741; 901/31
[58] Field of Search .................................. 294/1.1, 86.4, 294/88, 119.1; 414/741; 901/30, 31, 37; 269/25, 33

[56] References Cited

U.S. PATENT DOCUMENTS

| | | | |
|---|---|---|---|
| 3,711,144 | 1/1973 | Briot | 294/88 |
| 3,971,585 | 7/1976 | LaBudde | 294/88 |
| 4,252,358 | 2/1981 | Klebs | 294/119.1 |
| 4,591,199 | 5/1986 | Zajac | 794/88 |
| 4,765,668 | 8/1988 | Slocum et al. | 294/119.1 |
| 4,775,271 | 10/1988 | Maccaferri | 294/119.1 |
| 4,852,928 | 8/1989 | Monforte | 294/119.1 |
| 4,865,375 | 9/1989 | Laub et al. | 294/119.1 |
| 5,163,729 | 11/1992 | Borcea et al. | 294/119.1 |
| 5,529,359 | 6/1996 | Borcea et al. | 294/119.1 |
| 5,755,475 | 5/1998 | Zajac, Jr. | 294/119.1 |

Primary Examiner—Dean J. Kramer
Attorney, Agent, or Firm—Godfrey & Kahn, S.C.

[57] ABSTRACT

A gripper assembly with an integrated heat shield. The integrated heat shield is in the form of a shell having one or more openings through which a gas may flow into and out of in order to create a cooling current flow. Two axially aligned and opposed cylinders, each having a main portion, are individually mounted to the shell and the shell substantially surrounds the main portion of each cylinder. Each cylinder has a piston and each piston has a piston rod. Each piston rod is coupled to a jaw and each jaw is supported by one or more guide rods slidably received in one or more sleeves mounted to the shell. The jaws are positioned substantially parallel to one another and operable to grasp and release objects of interest. Motion of the jaws is synchronized by a synchronization mechanism.

25 Claims, 5 Drawing Sheets

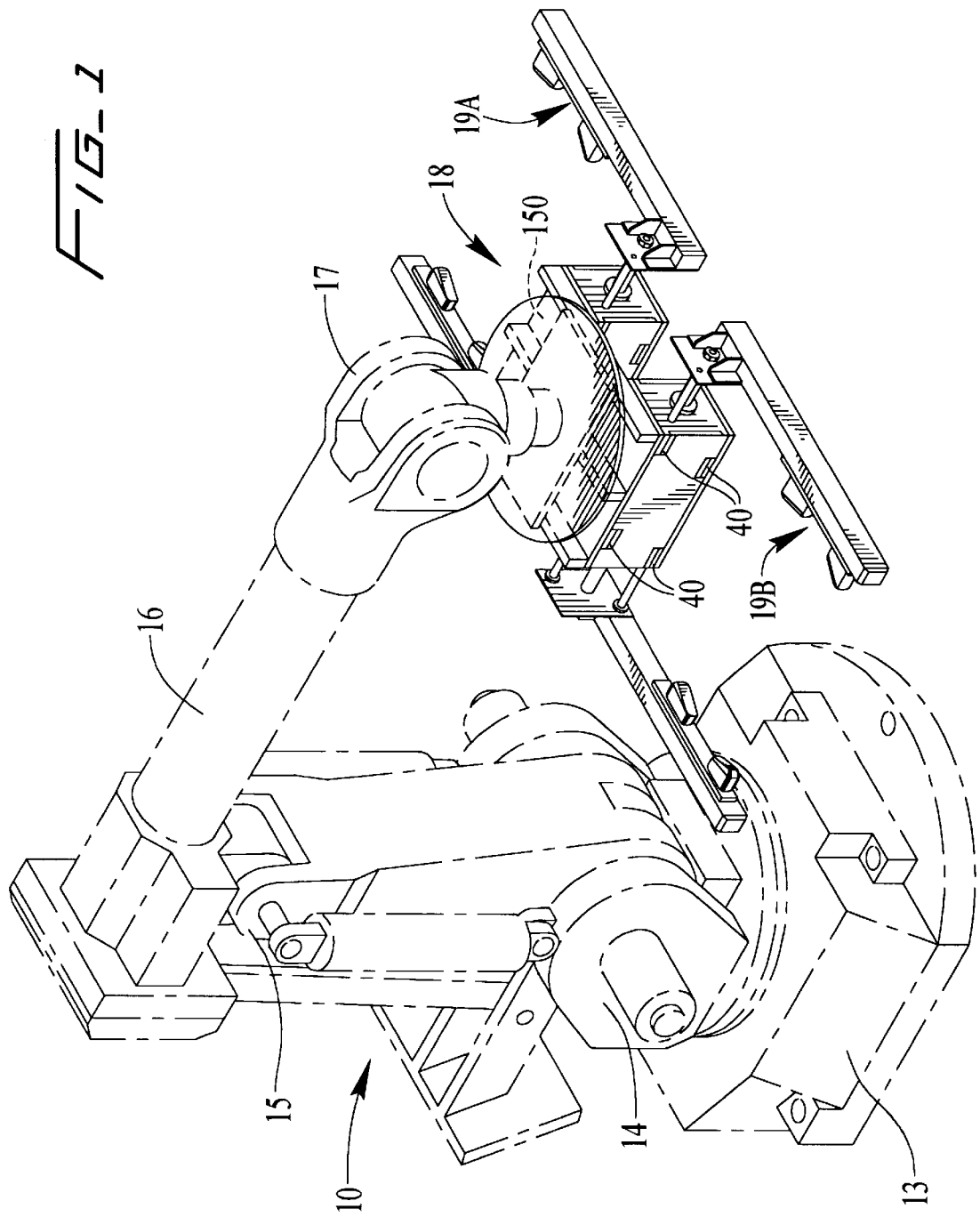

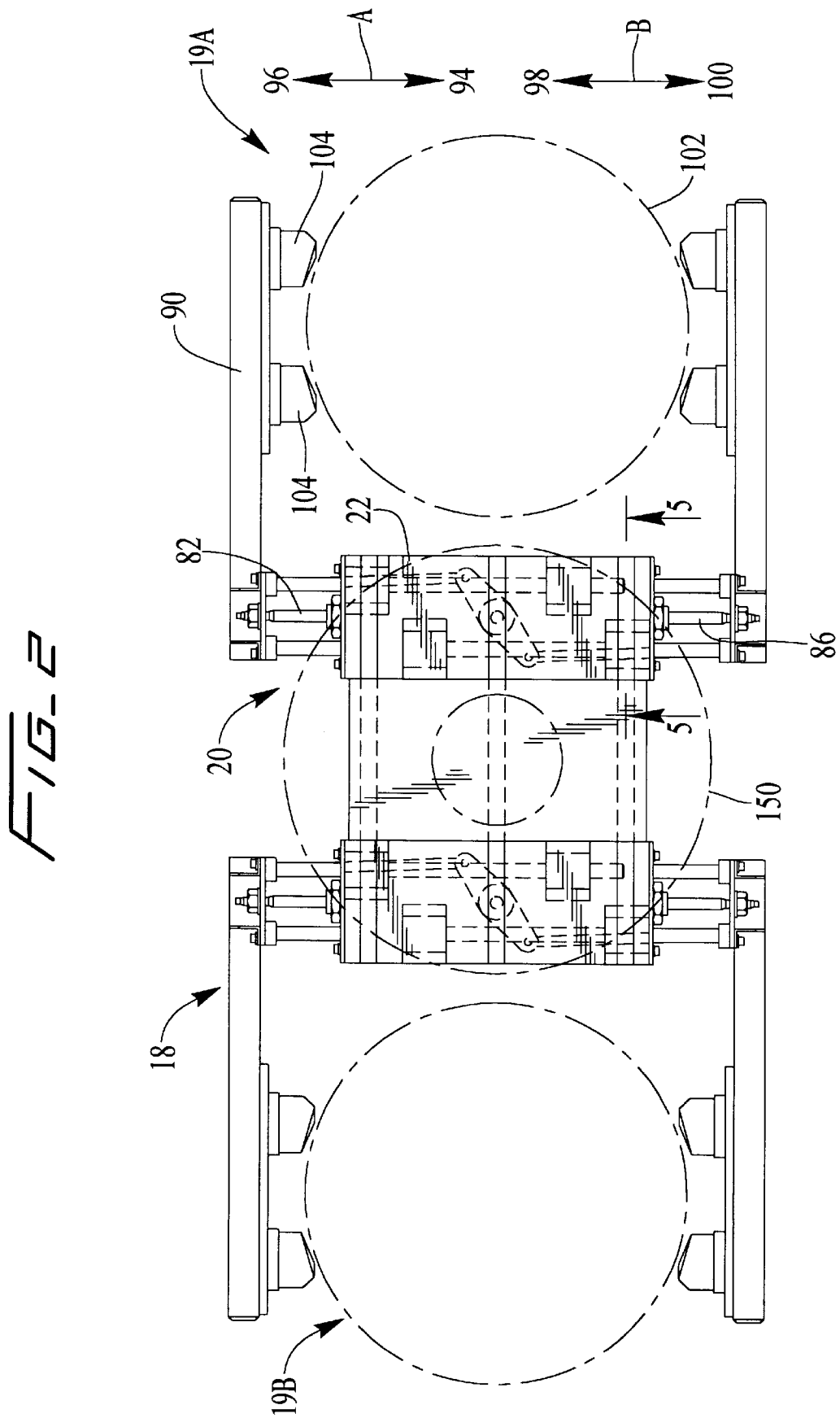

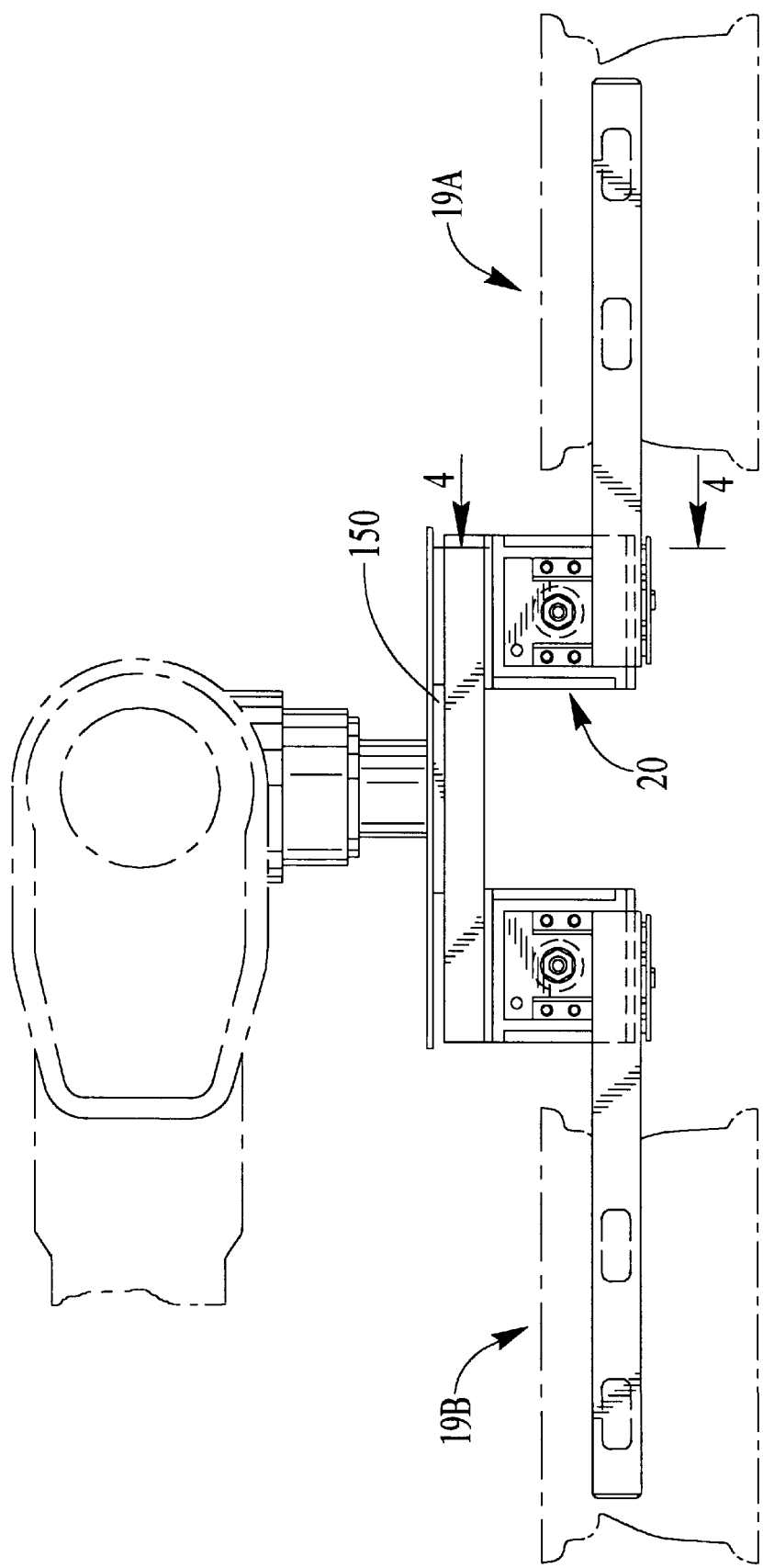

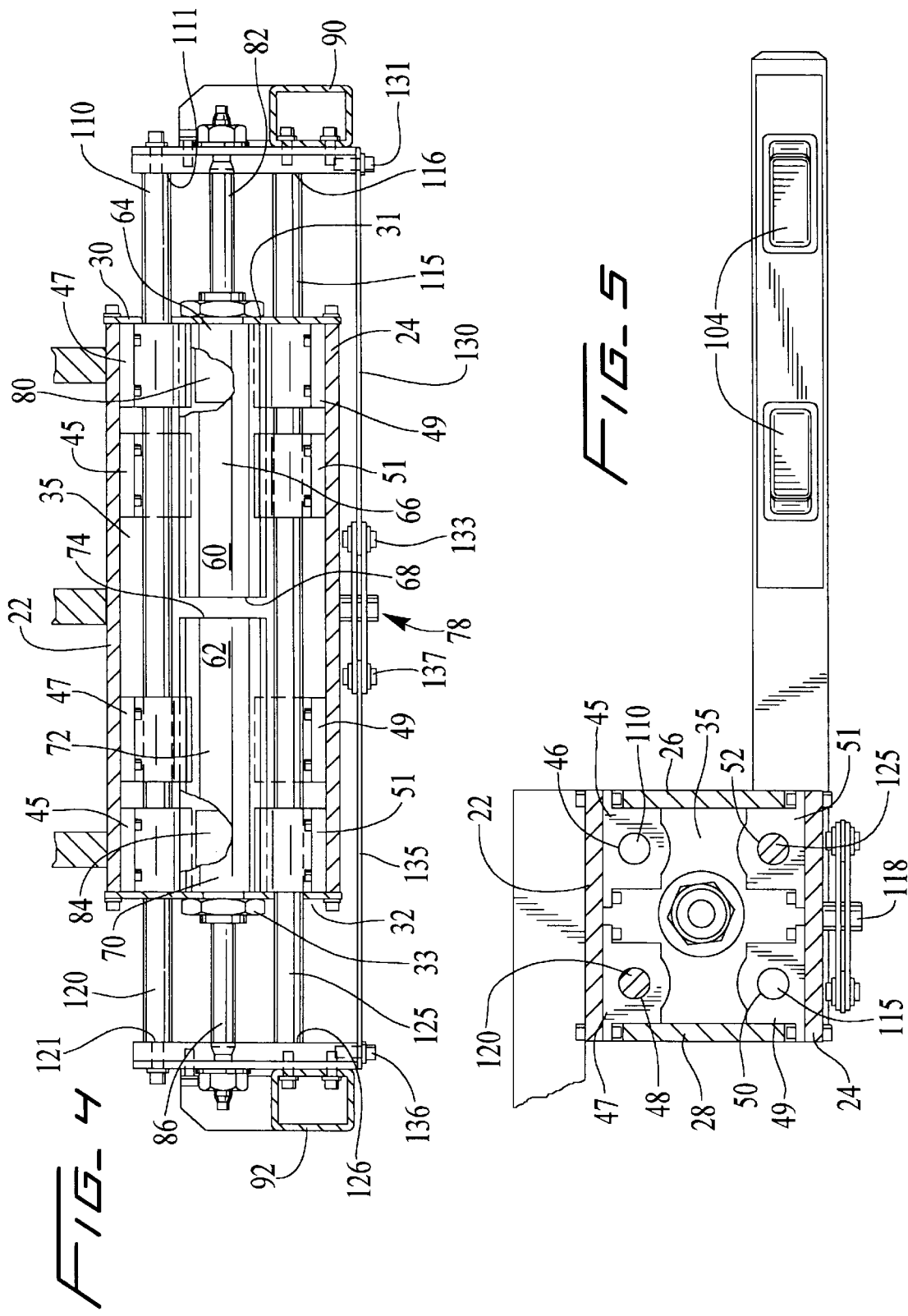

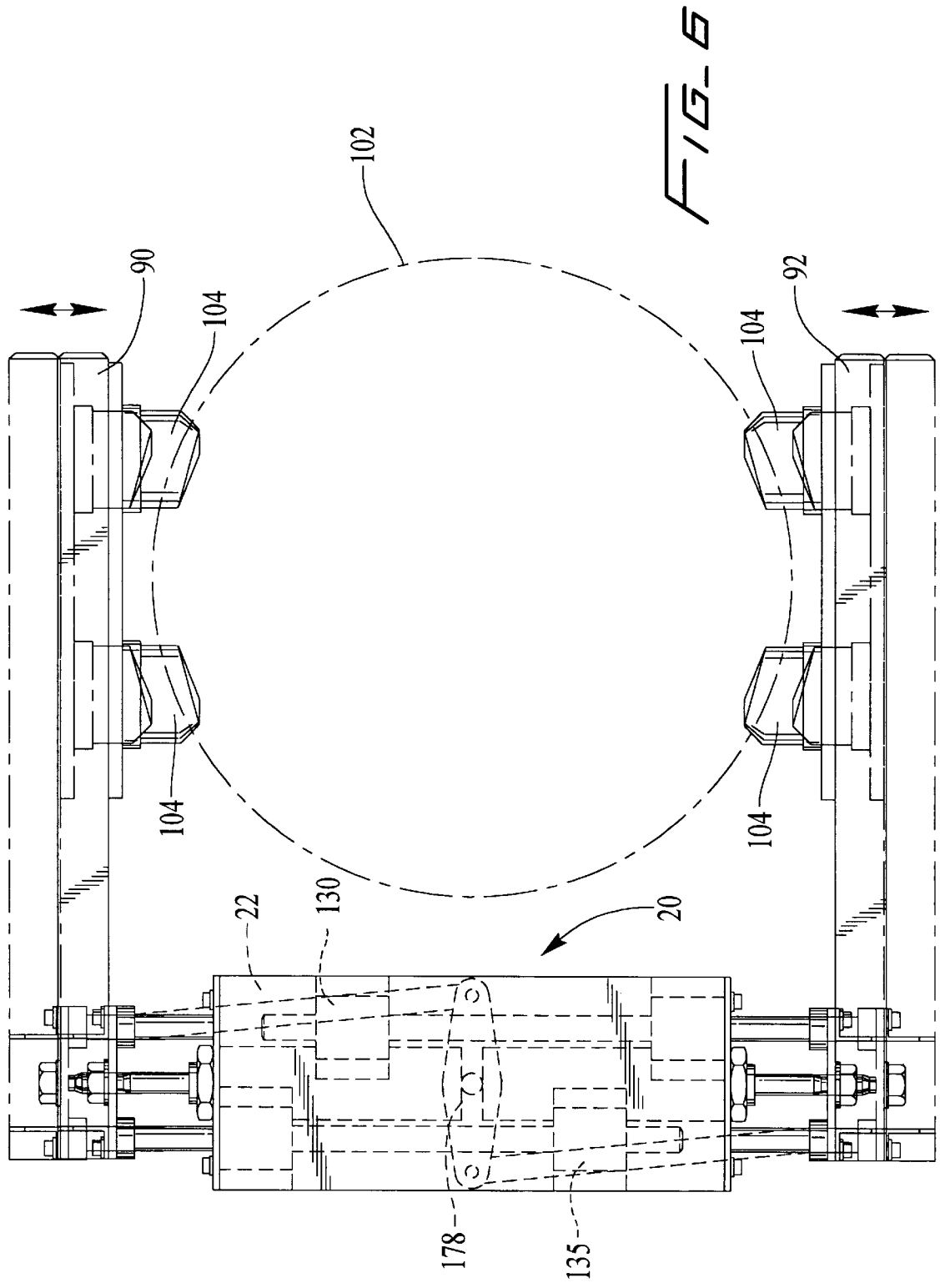

ND HEAT SHIELD

GRIPPER ASSEMBLY WITH INTEGRATED HEAT SHIELD

FIELD OF THE INVENTION

The present invention relates generally to end effectors, which are sometimes referred to as "grippers" or "hands," for industrial robots. More particularly, the present invention relates to an end effector particularly suited for handling heated objects.

BACKGROUND OF THE INVENTION

Jointed-arm robots can perform complex actions because the various sections of the jointed arm turn around six joints or axes. A jointed-arm robot such as the industrial robot 10 shown in FIG. 1 has a base 13, a shoulder 14, an elbow 15, an arm 16, a wrist 17, and an end effector 18. The end effector of the robot is one of its more important components because it allows the robot to grip or hold objects of interest.

Various robot end effectors or grippers are known in the art. For example, U.S. Pat. No. 5,163,729 (the "'729 Patent") discloses a parallel gripper having a main body made from a solid block of material. The main body has four relatively long bores and two chambers or cylinders formed within it. Each chamber or cylinder formed in the main body has a piston within it, the piston connected to a piston rod. A pair of opposed jaws are supported with respect to the main body by two pairs of support or guide rods. Each guide rod is slidably received in one of the four bores. The guide rods support the jaws for movement toward and away from the main body. The movement of each mounting block is effected by one of the two cylinder-piston assemblies in the main body. One of the guide rods supporting each of the mounting blocks is provided with a pinion rack which is disposed in meshing relationship with a pinion gear. The interaction of the guide rods, one coupled to each mounting block, via the pinion gear, causes the movement of the mounting blocks to be synchronized when the pistons in the cylinders are activated.

A similar device is shown in U.S. Pat. No. 4,591,199 (the "'199 Patent"). The '199 Patent discloses a gripper having two coaxial fluid chambers. Each chamber has a piston that moves within it and each piston is connected to a jaw. Movement of the pistons toward and away from each other causes the jaws to move toward and away from each other. Each piston is mounted to one end of a threaded rod. The rod is mounted in a bearing and is used to synchronize the motion of the two jaws.

While the devices shown in the '729 and '199 Patents are acceptable for some applications, they have several drawbacks. First, the synchronizing mechanisms in each device have interacting teeth and grooves. In the '729 Patent the teeth on a pinion gear mesh with the teeth on a pinion rack. In the '199 Patent, the female threads in the piston are engaged with male threads in the rod. These types of mechanisms must be lubricated to operate properly and can, under certain conditions (e.g., insufficient lubrication or misalignment of teeth), bind or jam, causing the gripper to malfunction. Second, each of the devices has a solid or closed body design. Specifically, each of the devices is constructed in such a way that the cylinders or chambers that hold the pistons are surrounded by thick walls. These walls are used as weight bearing members in each gripper and are directly exposed to the operating environment of the grippers.

The drawbacks of grippers or end effectors like those shown in the '729 and '199 Patents are particularly apparent when they are used to handle relatively high volumes of objects, relatively hot objects, or both. With respect to high temperature applications such as removing an aluminum wheel from a furnace, heat may be transferred directly from the wheel and ambient air to the end effector. This heat may affect the components of the end effector and, in particular, affect the cylinder seals. Excess heat in the cylinder seals can cause excess wear and binding of the cylinder-piston assembly. Efforts to mount heat shields externally on end effectors have proven less than satisfactory. While the shields prevent over heating, they often cause weight and balance problems for robots.

With respect to high volume applications, maintenance, lubrication, and binding problems are more prevalent when large numbers of objects are handled. To handle each object, the jaws of the end effector must be opened and closed or cycled at least once. The probability of a lubricant failure or misalignment of the teeth in a synchronizing mechanism increases the more times the jaws are opened and closed. Thus, there are typically more binding and jamming problems in existing end effectors when a large number of objects are handled.

Accordingly, there is a need for an end effector that can be used in relatively high temperature, high volume applications without overheating or jamming. Further, it would be desirable if such an end effector had a relatively simple design and could be constructed from commercially available components.

OBJECTS AND SUMMARY OF THE INVENTION

Therefore, it is an object of the present invention to provide an end effector having two parallel jaws.

A further object of the present invention is to provide an end effector having a simple and effective mechanism for synchronizing the motion of the jaws and which is not susceptible to binding or jamming.

A still further object of the present invention is to provide an end effector that can effectively operate in high temperature environments.

Yet another object of the present invention is to provide an end effector that is relatively simple in design and that can be constructed from commercially available materials and components.

These and other objects and advantages are achieved in an end effector or gripper having a shell with an interior portion and at least one opening through which a gas or gases, such as air, may flow into and out of the interior portion of the shell. The shell may be formed from several plates bolted or otherwise joined together. Positioned within the shell are a plurality of sleeves, which may be bolted to the top and bottom plates of the shell.

Two axially aligned and opposed cylinders, each having a main portion, are individually mounted to the shell so that the shell substantially surrounds and is spaced a distance from the main portion of each cylinder. A piston is disposed in each cylinder and each piston has a piston rod. An arm or one of a pair of jaws is coupled to each piston rod and motion of the pistons, which is transferred to the piston rods, causes the arms or jaws to move. The jaws are aligned so as to be substantially parallel to another and this alignment causes them to close and open in order to pinch and release objects of interest.

The jaws are supported and controlled by diagonally-positioned guide or support rods. One pair of support rods is coupled to each jaw. In one embodiment, each support rod in each pair of support rods is slidably received by two sleeves mounted on the shell. Two motion rods are coupled in force transmission relation to each other by a centrally-positioned lever arm and are used to synchronize the motion of the jaws. In a second embodiment, there are no motion rods and only one support rod in each pair of support rods is slidably received in two sleeves while the other support rods, one from each pair, are coupled in force transmission relation by the lever arm and used to synchronize the motion of the jaws.

Further objects and advantages of the present invention will become more apparent from the following detailed description of the invention taken in combination with the accompanying drawings.

BRIEF DESCRIPTION OF THE DRAWINGS

In the drawings:

FIG. 1 is a perspective, environmental view of an exemplary industrial robot having an end effector of the present invention mounted thereon;

FIG. 2 is a top plan view of the end effector of the present invention;

FIG. 3 is side view of the end effector of the present invention;

FIG. 4 is a cross-sectional view of the end effector of the present invention taken along the line 4—4 of FIG. 3;

FIG. 5 is a cross-sectional view of the end effector of the present invention taken along line 5—5 of FIG. 2; and FIG. 6 is a partial top plan view of the end effector of the present invention.

DETAILED DESCRIPTION

As indicated above, an industrial robot 10 which includes the base 13, shoulder 14, elbow 15, arm 16, wrist 17, and end effector 1 8 is shown in FIG. 1. As best seen by reference to FIGS. 1, 2, and 3, the end effector 18 includes two identical grippers 19A and 19B. Each gripper 19A, 19B includes a shell 20 which has a top plate 22, a bottom plate 24, a first side plate 26, a second side plate 28, a first end plate 30 having a bore 31, and a second end plate 32 having a bore 33. (FIGS. 4 and 5) The plates may be bolted (as shown) or otherwise joined together (such as by welding or the like) to form a rectangular parallelepiped. As would be apparent to those skilled in the art, it is possible to form the shell 20 in a variety of ways and also reduce the number of components from which it is made by, for example, casting one or more plates as integral units. Preferably, the shell is made from a metal or other material which can withstand temperatures of about 850° F. In the preferred embodiment, the plates are made from aluminum.

The shell 20 has an interior portion 35 which is defined by the plates 22, 24, 26, 28, 30, and 32. The plates may be sized and shaped so that when they are joined together one or more openings 40 (FIG. 1) exist in the shell 20. Alternatively, the openings 40 may be formed by boring holes in one or more of the plates. The openings 40 are specifically designed to allow a gas or gases, such as atmospheric air, to flow into and out of the interior portion of the shell. The flowing air provides a cooling action to components of the end effector 18 that are located within the shell 20. Thus, the shell 20 acts as a heat shield. It has been found that the shell 20 is effective to maintain a temperature differential, between the air in the interior portion of the shell 20 and a held hot wheels of about 500° F. Additionally, the shell 20, acting as a heat shield, prevents the temperature of the components inside it from rising above 400° F., the temperature at which seals in the cylinders (discussed below) generally fail.

Mounted on the right hand side on the top plate 22 (as seen in FIGS. 4 and 5) are two blocks 45 each having a low-friction sleeve 46 formed therein. Mounted on the left hand side of the top plate 22 are two blocks 47 each having a low-friction sleeve 48. Each sleeve 46, 48 is designed to slidably receive a support rod (discussed below). Similar to the top plate 22, the left hand side of the bottom plate 24 has two blocks 49 mounted to it and each block 49 has a low friction sleeve 50 formed therein. The right hand side of the bottom plate 24 has two blocks 51, each with a sleeve 52. Each sleeve 50, 52 is designed to slidably receive a support rod (discussed below). To achieve a suitably low level of friction, the sleeves 46, 48, 50, and 52 may be coated with commercially available Teflon® coatings as well as other friction reducing materials.

The end effector 18 includes two coaxially aligned and oppositely opposed cylinders 60 and 62. The cylinder 60 has a first end 64, a main portion 66, and a second end 68. The first end 64 is mounted in the bore 31. The cylinder 62 has a front end 70, a main portion 72, and a second end 74. The first end 70 of the cylinder 62 is mounted in the bore 33. The shell 20 substantially surrounds and is in spaced relation relative to each of the cylinders 60 and 62. A lever arm 78 is coupled to the bottom plate 24 or in an alternative embodiment (FIG. 7) could be coupled to the second ends 68, 74, of the cylinders 60, 62.

Each of the cylinders contains a single piston with a piston rod. Specifically, the cylinder 60 has a piston 80 with a piston rod 82 and the cylinder 62 has a piston 84 with a piston rod 86. The piston rod 82 is coupled to an arm or jaw 90 and the piston rod 86 is coupled to an arm or jaw 92. The two jaws 90 and 92 are aligned substantially parallel to one another and activation of the pistons 80 and 84 within the cylinders 90 and 92 (by methods known in the art) causes the piston rods to extend or retract in correspondence with the motion of the pistons. As can be seen by reference to FIGS. 2 and 6, each piston is movable along a linear path of travel. The first piston 80 moves along a path "A" between a first position 94 and a second position 96. The second piston 84 moves along a path "A" between a first position 98 and a second position 100. This motion causes the jaws 90 and 92 to move toward and away from each other, enabling the end effector 18 to grip and release objects of interest such as, for example, a wheel 102. Each jaw 90, 92 may have one or more fingers 104 to facilitate gripping of the wheel 102.

The pneumatic cylinder-piston assemblies shown in the drawings are just one type of activator which may be suitable for use in the present invention. Such assemblies are available from Bimba Manufacturing Company, Monee, Ill. and sold as Bimba air cylinders. Other activators including hydraulic and electric activators could be used and their use is within the knowledge of those skilled in the art of the present invention.

Each of the jaws 90, 92 is coupled to a pair of diagonally-opposed support rods. The jaw 90 is connected to a first support rod 110, which is slidably received in the sleeves 46. The support rod 110 has a first end 111 which is connected to the jaw 90 and a second end (not shown). The jaw 90 is also coupled to a second support rod 115 which is slidably received in the sleeves 50 and has a first end 116 which is coupled to the jaw 90 and a second end (not shown).

The jaw 92 is coupled to a third support rod 120, which is slidably received in the sleeves 48. The third support rod 120 has a first end 121 which is connected to the jaw 92 and a second end (not shown). The jaw 92 is also coupled to a fourth support rod 125 which is slidably received in sleeves 52 and has a first end 126 which is coupled to the jaw 92 and a second end (not shown). The two pairs of support rods 110, 115 and 120, 125 slidably support the jaws 90, 92, respectively, and act as the main load bearing members, rather than the piston rods 82, 86, transferring the weight of the load (wheel 102) to the shell 20.

The motion of the jaws 90, 92 is initiated by movement of the pistons 80, 84 and controlled by the support rods 110, 115, 120, and 125. Referring mainly to FIGS. 2 and 4, the motion is synchronized by means of a pair of motion rods; a first motion rod 130 which has a first end 131 and a second end 133; and a second motion rod 135 which has a first end 136 and a second end 137. The first end 131 of the first motion rod 130 is coupled to the jaw 90 and the second end 133 is coupled to the lever arm 78. Similarly, the first end 136 of the motion rod 135 is coupled to the jaw 92 and the second end 137 is coupled to the lever arm 78. Thus, the motion rods 130 and 135 and lever arm 78 link the jaws 90, 92 together in force transmission relation. If either of the pistons 80, 84 moves at a faster rate than the other, causing its respective jaw to move at a faster rate, the motion rods 130, 135, through the lever arm 78, will effectively brake the faster moving jaw and transfer the increased rate of motion to the slower moving jaw.

FIGS. 1, 2, and 3 show an embodiment of the present invention where the two grippers 19A and 19B are mounted to a mounting plate 150 which is in turn mounted to the wrist 17 on the robot arm 16. Mounting two grippers to a robot as shown increases the handling capacity of the robot, even though only one gripper may be needed for certain applications.

As can be seen from the discussion above, the present invention provides an improved robot gripper or end effector that overcomes the problems of the prior art. In particular, each gripper of the end effector has a synchronizing mechanism which does not have meshing teeth and is, therefore, not subject to the same lubrication and alignment problems of previous devices. In addition, each gripper 19A, 19B has an integrated heat shield which protects the internal components from ambient heat thereby extending the useful life of each gripper and avoiding the weight and balancing problems associated with add-on heat shields.

While the present invention has been described in what are believed to be the most preferred forms, it is to be understood that the invention is not confined to the particular construction and arrangement of the components herein illustrated and described, but embraces such modified forms thereof as come within the scope of the appended claims.

What is claimed is:

1. An end effector for use with an industrial robot and for grasping a heated object the end effector comprising:
 a shell having an interior portion and at least one opening through which a gas may flow into and out of the interior portion of the shell;
 two actuators individually mounted to the shell, the shell substantially surrounding and in spaced relation to the actuators;
 a jaw coupled to each actuator; and
 at least one guide coupled to each jaw, each guide coupled to the shell and for bearing the weight of the jaw coupled to each actuator;
 wherein the shell is effective to maintain the actuators at a temperature that is at least about 500° F. less than the temperature of the heated object grasped by the end effector, but not less than the ambient temperature.

2. An end effector as in claim 1, wherein the actuators are axially aligned and opposed to each other.

3. An end effector as in claim 1, wherein the shell is constructed from aluminum plates.

4. An end effector as in claim 1, wherein each jaw has one or more fingers for grasping the heated object.

5. An end effector as in claim 1, further comprising a synchronization mechanism coupled to each of the jaws.

6. An end effector as in claim 5, wherein the synchronization mechanism includes a lever arm coupled to the bottom of the shell and a first motion rod coupled to the lever arm and one of the jaws and a second motion rod coupled to the lever arm and the other one of the jaws.

7. An end effector for use with an industrial robot and for grasping a heated object, the end effector comprising:
 a shell having an interior portion, a plurality of sleeves, and at least one opening through which a gas may flow into and out of the interior portion of the shell;
 two actuators individually mounted to the shell, the shell substantially surrounding and in spaced relation to the actuators;
 a jaw coupled to each actuator; and
 at least two guides coupled to each jaw, each guide mounted in at least one of the sleeves in the shell, each guide for bearing the weight of the jaw coupled to each actuator;
 wherein the shell is effective to maintain the actuators at a temperature that is less than the temperature of the heated object grasped by the end effector.

8. An end effector as in claim 7, wherein in each sleeve is coated with a friction reducing material.

9. An end effector for use with an industrial robot and for grasping heated objects, the end effector comprising:
 two substantially identical grippers mounted substantially parallel and opposed to one another; each gripper including:
 a shell having an interior portion of at least one opening through which a gas may flow into and out of the interior portion of the shell;
 two actuators individually mounted to the shell, the shell substantially surrounding and in spaced relation to the actuators;
 a jaw coupled to each actuator;
 at least one guide coupled to each jaw, each guide coupled to the shell and for bearing the weight of the jaw coupled to each actuator;
 wherein the shell is effected to maintain the actuators at a temperature of about 400° F. or less when the end effector grasps a heated object; and
 wherein the at least one opening has a length extending through the shell along a longitudinal axis that is perpendicular to the at least one guide.

10. An end effector as in claim 9, wherein the two actuators are axially aligned and opposed to each other.

11. An end effector as in claim 9, wherein each jaw has one or more fingers for grasping the heated object.

12. An end effector as in claim 9, further comprising a synchronization mechanism coupled to each of the jaws.

13. An end effector as in claim 12, wherein the synchronization mechanism includes a lever arm coupled to the bottom of the shell and a first motion rod coupled to the lever arm and one of the jaws and a second motion rod coupled to the lever arm and the other one of the jaws.

14. An end effector for use with an industrial robot and for grasping heated objects, the end effector comprising:

two substantially identical grippers mounted substantially parallel and opposed to one another; each gripper including:
 a shell having an interior portion and at least one opening through which a gas may flow into and out of the interior portion of the shell;
 two actuators individually mounted to the shell, the shell substantially surrounding and in spaced relation to the actuators;
 a jaw coupled to each actuator;
 at least one guide coupled to each jaw, each guide coupled to the shell and for bearing the weight of the jaw coupled to each actuator;
 wherein the shell is effected to maintain the actuators at a temperature of about 400° F. or less when the end effector grasps a heated object;
 wherein each jaw has one or more fingers for grasping the heated object; and
 wherein the shell includes a plurality of sleeves and at least two guides coupled to each jaw, each guide mounted in at least one of the sleeves in the shell.

15. An end effector for use with an industrial robot and for grasping heated objects, the end effector comprising:
 two substantially identical grippers mounted substantially parallel and opposed to one another; each gripper including:
 a shell having an interior portion and at least one opening through which a gas may flow into and out of the interior portion of the shell;
 two actuators individually mounted to the shell the shell substantially surrounding and in spaced relation to the actuators;
 a jaw coupled to each actuator;
 at least one guide coupled to each jaw, each guide coupled to the shell and for bearing the weight of the jaw coupled to each actuator;
 wherein the shell is effected to maintain the actuators at a temperature of about 400° F. or less when the end effector grasps a heated object;
 wherein each jaw has one or more fingers for grasping the heated object;
 wherein the shell includes a plurality of sleeves and at least two guides coupled to each jaw, each guide mounted in at least one of the sleeves in the shell; and
 wherein each sleeve is coated with a friction reducing material.

16. An end effector for use with an industrial robot and for grasping a heated object, the end effector comprising:
 a shell having an interior portion, at least one opening through which a gas may flow into and out of the interior portion of the shell, and a plurality of sleeves, the shell operable to maintain the temperature of the interior portion at least about 500° F. less than the temperature of the heated object grasped by the end effector;
 two axially aligned and opposed cylinders, each cylinder having a main portion and individually mounted to the shell, the shell substantially surrounding and in spaced relation to the main portion of each cylinder;
 a piston disposed in each cylinder, each piston having a piston rod;
 a jaw coupled to each piston rod; and
 a pair of diagonally-positioned guide rods coupled to each jaw, each rod in each pair of guide rods slidably received by at least one of the plurality of sleeves.

17. An end effector as in claim 16, wherein each jaw has one or more fingers for grasping the heated object.

18. An end effector as in claim 16, wherein in each sleeve is coated with a friction reducing material.

19. An end effector as in claim 16, further comprising a synchronization mechanism coupled to each of the jaws.

20. An end effector as in claim 19, wherein the synchronization mechanism includes a lever arm coupled to the bottom of the shell and a first motion rod coupled to the lever arm and one of the jaws and a second motion rod coupled to the lever arm and the other one of the jaws.

21. An end effector for use with an industrial robot and for grasping a heated object, the end effector comprising:
 a frame having a plurality of sleeves;
 two actuators mounted to the frame;
 a jaw coupled to each actuator;
 at least one guide coupled to each jaw, each guide positioned within at least one of the plurality of sleeves of the frame and for bearing the weight of the jaw coupled to each actuator; and
 a synchronization mechanism having a lever arm coupled to the bottom of the frame, a first motion rod coupled to the lever arm and one of the jaws, and a second motion rod coupled to the lever arm and the other one of the jaws.

22. An end effector as in claim 21, wherein the actuators are axially aligned and opposed to each other.

23. An end effector as in claim 21, wherein each jaw has one or more fingers for grasping a heated object.

24. An end effector as in claim 21, wherein each sleeve is coated with a friction reducing material.

25. An end effector for grasping a heated object, the end effector comprising:
 a shell having an interior portion and at least one opening through which a gas may flow into and out of the interior portion of the shell;
 at least one actuator mounted to the shell, the shell substantially surrounding and in spaced relation to the actuator;
 a jaw coupled to the at least one actuator;
 at least one guide coupled to the at least one jaw, the at least one guide coupled to the shell and for bearing the weight of the jaw coupled to the actuator;
 wherein the shell is effected to maintain the actuator at a temperature of about 400° F. or less when the end effector grasps a heated object; and
 wherein the at least one opening has a length extending through the shell along a longitudinal axis that is perpendicular to the at least one guide.

* * * * *